US012343947B2

(12) United States Patent
Kojima et al.

(10) Patent No.: US 12,343,947 B2
(45) Date of Patent: Jul. 1, 2025

(54) METHOD FOR PRODUCING COMPOSITE MOLDED BODY

(71) Applicant: TOYOTA JIDOSHA KABUSHIKI KAISHA, Toyota (JP)

(72) Inventors: Tatsuya Kojima, Okazaki (JP); Takashi Ike, Miyoshi (JP); Natsuhiko Katahira, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 212 days.

(21) Appl. No.: 18/318,340

(22) Filed: May 16, 2023

(65) Prior Publication Data

US 2024/0025135 A1     Jan. 25, 2024

(30) Foreign Application Priority Data

Jul. 19, 2022  (JP) .................................. 2022-114537

(51) Int. Cl.
*B29C 70/44*     (2006.01)
*B29C 70/84*     (2006.01)
*B29L 31/08*     (2006.01)

(52) U.S. Cl.
CPC .............. *B29C 70/44* (2013.01); *B29C 70/84* (2013.01); *B29L 2031/087* (2013.01)

(58) Field of Classification Search
CPC ...... B29C 70/44; B29C 70/84; B32B 37/1009
See application file for complete search history.

(56) References Cited

U.S. PATENT DOCUMENTS

| | | | |
|---|---|---|---|
| 2009/0261199 A1* | 10/2009 | McCarville | B29C 70/44 156/196 |
| 2011/0171038 A1 | 7/2011 | Esaki et al. | |
| 2011/0259515 A1* | 10/2011 | Rotter | B29C 70/541 156/60 |
| 2012/0091627 A1 | 4/2012 | Schibsbye | |
| 2021/0001519 A1* | 1/2021 | Wang | B29C 44/1271 |

FOREIGN PATENT DOCUMENTS

| | | |
|---|---|---|
| JP | 2009-190407 A | 8/2009 |
| JP | 2011-137386 A | 7/2011 |
| JP | 2012-82832 A | 4/2012 |
| WO | WO 2017/126287 A1 | 7/2017 |

* cited by examiner

*Primary Examiner* — Christopher T Schatz
(74) *Attorney, Agent, or Firm* — Oblon, McClelland, Maier & Neustadt, L.L.P.

(57) ABSTRACT

A method is provided for producing a composite molded body for forming first and second composite molded bodies by molding the first and second composite materials, respectively. The first and second composite molded bodies include joint portions that can be joined to one another. The joint portions are joined together to form a composite material joint body. The first and second composite materials include to-be-joined portions corresponding to the joint portions of the first and second composite molded bodies, respectively. In the space sandwiched between the first and second composite materials a mandrel and a pressing portion are disposed in the mold, a mandrel, and the pressing portion presses the mandrel against the to-be-joined portion of the second composite material.

7 Claims, 17 Drawing Sheets

METHOD FOR PRODUCING COMPOSITE MOLDED BODY

CROSS-REFERENCE TO RELATED APPLICATION

This application claims priority to Japanese Patent Application No. 2022-114537 filed on Jul. 19, 2022 incorporated herein by reference in its entirety.

BACKGROUND

1. Technical Field

The present disclosure relates to a method for producing a composite molded body, and relates to a method for producing two composite molded bodies that can be joined to each other to form a composite material joint body.

2. Description of Related Art

In a production method disclosed in WO 2017/126287, a wind turbine blade made of a fiber-reinforced resin hollow part is integrally molded using a low-melting-point alloy core. Further, in the production method disclosed in Japanese Unexamined Patent Application Publication No. 2011-137386 (JP 2011-137386 A) and Japanese Unexamined Patent Application Publication No. 2012-082832 (JP 2012-082832 A), production is performed using two half-split molds corresponding to the half shape of the blade.

SUMMARY

The inventors of the present application have found the following issues. The technique disclosed in WO 2017/126287 is Resin Transfer Molding (RTM) in which a reinforcing fiber substrate that is not impregnated with a resin in advance is subsequently impregnated with a liquid resin. In the technique disclosed in WO 2017/126287, when the same reinforcing fiber is used, it is necessary to impregnate a dense reinforcing fiber layer with a liquid resin in a short time as compared with a molding method in which pressure is applied to a prepreg base material impregnated with a resin in advance. Thus, in the production method disclosed in WO 2017/126287, the material properties is inferior as compared with the molding method because (1) a high-performance resin having a high viscosity cannot be used, and (2) the resin is not impregnated at a high fiber content. Therefore, in order to obtain the same product strength, design such as increasing the thickness is required, which leads to a disadvantage in which the mass is increased. Further, there is an issue that the core using a low-melting-point alloy requires an extra process such as production and elution of the core. Further, there is an issue that it takes time for the temperature of the low-melting-point alloy core to increase during resin hardening since the specific gravity of the low-melting-point alloy is heavier than that of iron, and the transport device is also large.

Although JP 2011-137386 A does not specify the material to be molded and the molding method, the production method disclosed in JP 2011-137386 A has the same issue as the production method disclosed in WO 2017/126287 when the production method disclosed in JP 2011-137386 A is RTM Further, when molding is performed using a prepreg material with the half-split mold, an autoclave is required in order to apply pressure to the material. However, there is an issue that when molding is performed using the autoclave, the equipment cost of the autoclave is high, and the molding time is long due to the temperature control by the atmosphere temperature (heating, cooling).

Although JP 2012-082832 A does not specify the material to be molded, the technique disclosed in JP 2012-082832 A has the same issue as the technique disclosed in WO 2017/126287 when the production method disclosed in JP 2012-082832 A is RTM. When the prepreg material is used, in the production method disclosed in JP 2012-082832 A, pressure can be applied by an internal bag. However, since the shape and the position of the web portion cannot be maintained, the web cannot be maintained with high accuracy every time mass production is performed. Further, the reinforcing fibers of the web that bear the critical strength stiffness are not continuous. As a result, there is an issue that the technique is applied to a flying object requiring a high reliability and a large wind turbine requiring a strength.

The present disclosure has been made in view of the above-described issues, and provides a method for producing a composite molded body capable of improving the shape accuracy of the joint portions of two composite molded bodies.

A method for producing a composite molded body according to the present disclosure is a method for producing a composite molded body in which a first and a second composite materials are shaped, and a first and a second composite molded bodies are shaped, the first and the second composite molded bodies each including a joint portion that is able to be joined to each other, the joint portion of each of the first and the second composite molded bodies being joined to each other to shape a composite material joint body, the first and the second composite materials each including a to-be-joined portion corresponding to the joint portion of each of the first and the second composite molded bodies.

The method includes:
  a step of arranging a mandrel and a pressing portion in a space sandwiched between the first and the second composite materials arranged in a mold, the arranged mandrel being sandwiched between the pressing portion and the to-be-joined portions of the first and the second composite materials; and
  a step in which the pressing portion presses the mandrel against the to-be-joined portion of the second composite material.

The mold may include a means for controlling the temperature of the mold by a heating medium (water, oil, gas, etc.) or electricity (heater, induction heating, dielectric heating, etc.).

Further, the composite molded body can be applied to both of a prepreg sheet impregnated with a semi-cured resin in advance and a method for filling and impregnating a reinforcing fiber sheet that is not impregnated with a resin with a liquid resin in a mold, but it is possible to obtain a product excellent in weight reduction by combining with a prepreg sheet excellent in the material properties.

According to such a configuration, the pressing portion presses the mandrel against the to-be-joined portion of the second composite material to form the second composite molded body and to form the second composite material. As a result, the joint portion of the second composite molded body with high shape accuracy can be formed. Therefore, it is possible to improve the shape accuracy between the joint portions of the first and the second composite molded bodies.

Further, in the step in which the pressing portion presses the mandrel against the to-be-joined portion of the second composite material, the pressing portion may include a first bag that is able to be expanded; and the pressing portion may press the mandrel against the to-be-joined portion of the second composite material by supplying gas into the first bag to pressurize an inner side of the first bag or expand the first bag.

According to such a configuration, the first bag can be expanded and pressed against the second composite material or the like having various shapes. Therefore, the second composite material having various shapes can be formed, and the joint portion of the second composite molded body having high shape accuracy can be formed.

Further, the first bag may include an end portion inserted between the to-be-joined portions of the first and the second composite materials; and the end portion of the first bag may press the to-be-joined portion of the first composite material against the mold by supplying the gas into the first bag to pressurize the inner side of the first bag or expand the first bag.

According to such a configuration, the end portion of the first bag presses the to-be-joined portion of the first composite material against the mold to form the first composite molded body. As a result, the joint portion of the first composite molded body with high shape accuracy can be formed.

Further, in the step in which the pressing portion presses the mandrel against the to-be-joined portion of the second composite material, the pressing portion may further include a second bag arranged in the first bag; and the pressing portion may supply the gas into the second bag to expand the second bag. Further, pressure P2 in the second bag may be greater than pressure P1 in the first bag.

According to such a configuration, it is possible to increase the force with which the mandrel is pressed against the to-be-joined portion of the second composite material by expansion of the second bag. Therefore, it is possible to improve the shape accuracy of the joint portion of the second composite molded body.

Further, in the step in which the pressing portion presses the mandrel against the to-be-joined portion of the second composite material, the pressing portion may include a thermal expansion body arranged in the first bag; and the pressing portion may heat and thermally expand the thermal expansion body.

According to such a configuration, it is possible to improve the shape accuracy of the joint portion of the second composite molded body using the thermal expansion body having a simple configuration.

According to such a configuration, a high-quality composite molded body can be produced with high productivity because the pressing portion applies the pressure to the composite material and the temperature of the mold can be controlled in a short time, even without using an autoclave that is expensive and takes a long time for temperature control, which is generally used when molding a high-quality composite product using a prepreg sheet.

Further, the composite material joint body may be a wing or a propeller of a flying object; and in the composite material joint body, the joint portion of each the first and the second composite molded bodies joined to each other may be a leading edge portion of the wing or the propeller of the flying object.

According to such a configuration, it is possible to form the leading edge portion of the wing or the propeller of the flying object with high shape accuracy.

According to the present disclosure, it is possible to improve the shape accuracy between the joint portions of the two composite molded bodies.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a specific embodiment to which the disclosure is applied will be described in detail with reference to the drawings. However, the disclosure is not limited to the following embodiment. The following description and drawings are simplified as appropriate for the sake of clarity.

First Embodiment

Figure 1:
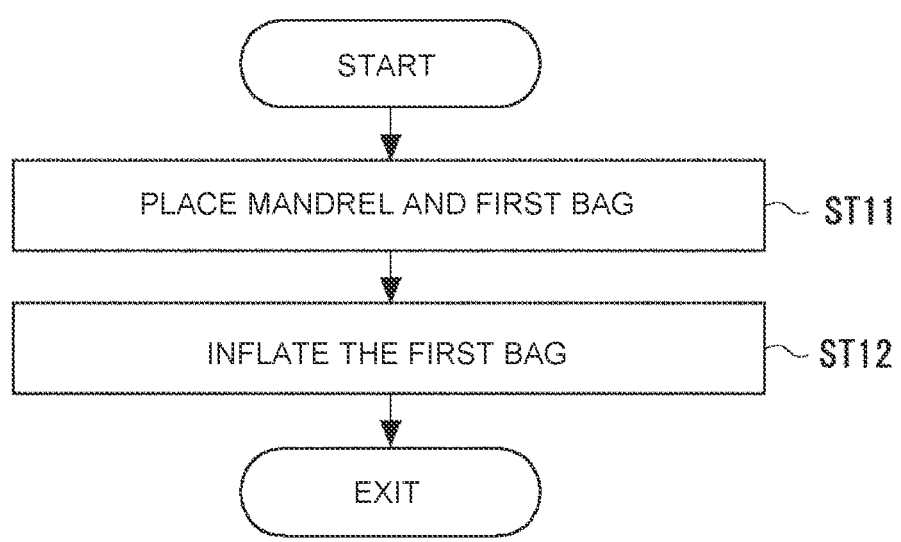
FIG. 1 is a flowchart showing a method for producing a composite molded body according to Embodiment 1.
Figure 2:
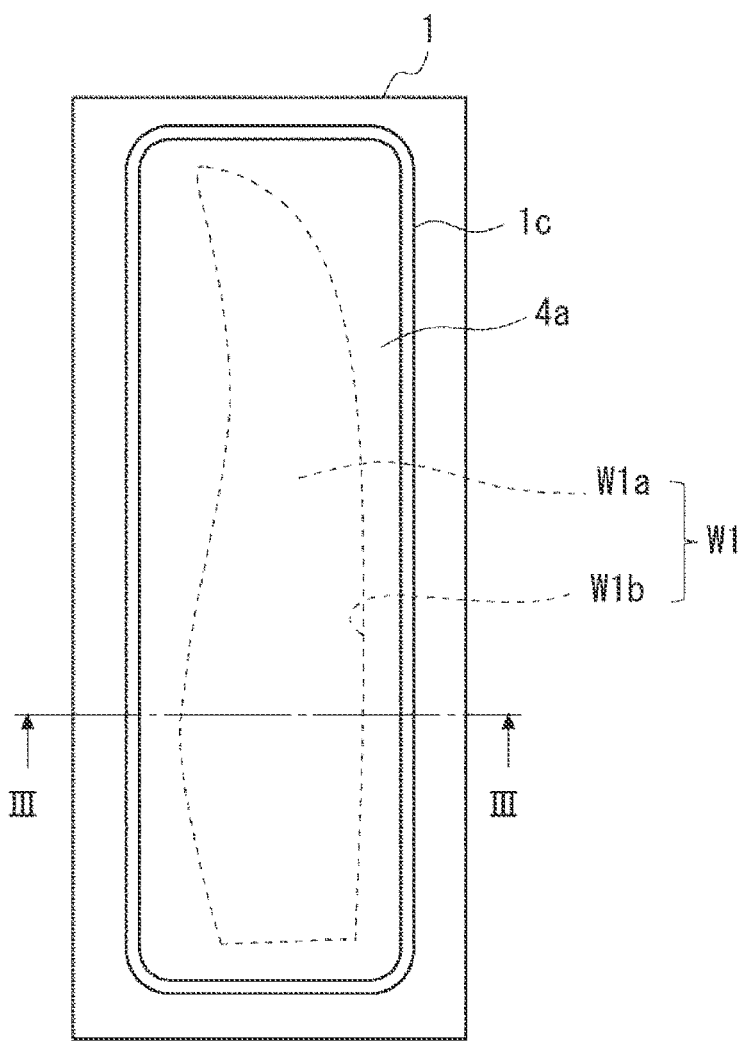
FIG. 2 is a schematic view showing an upper mold in one step of the method for producing a composite molded body according to Embodiment 1.
Figure 3:
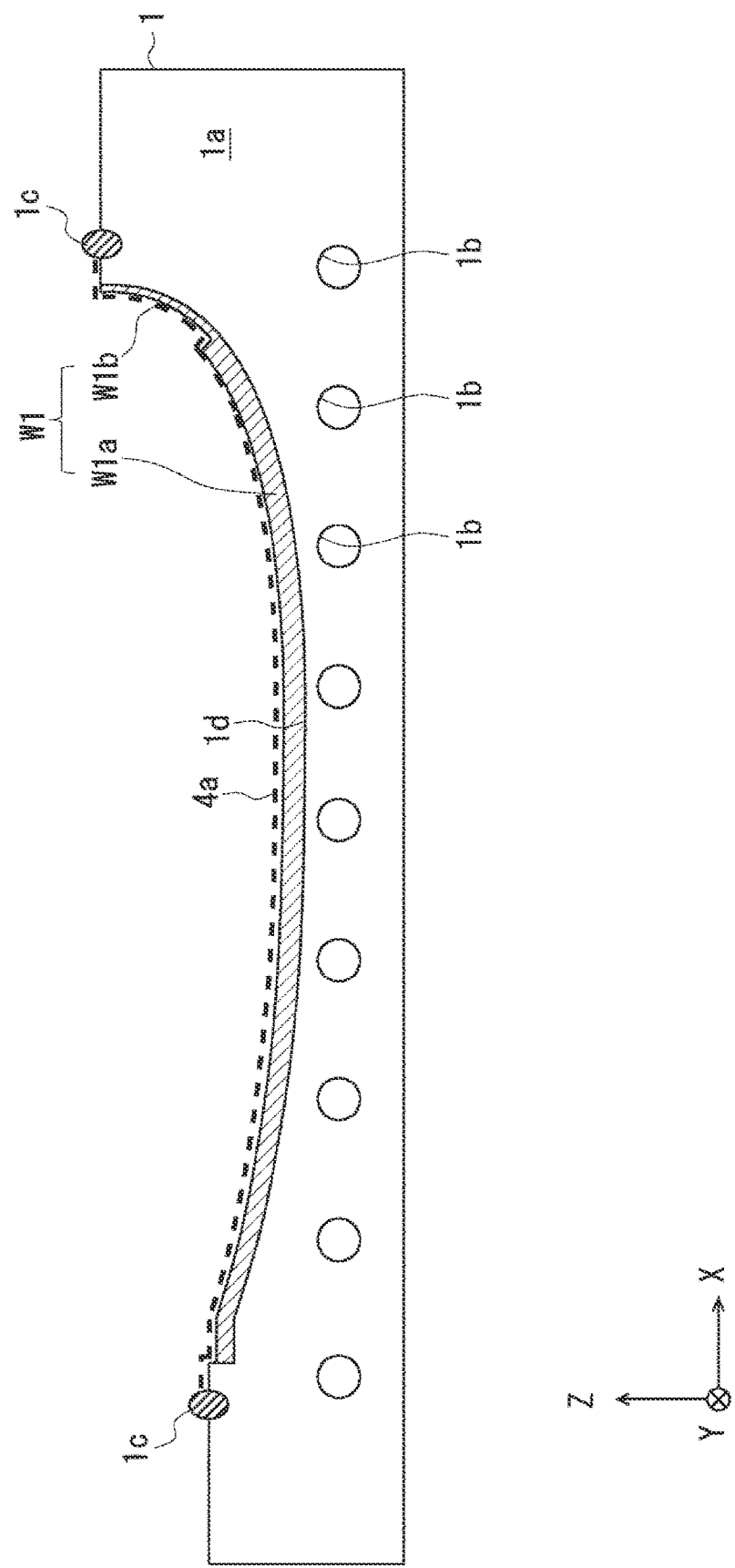
FIG. 3 is a schematic view showing a cross section of an upper mold in one step of the method for producing a composite molded body according to Embodiment 1.
Figure 4:
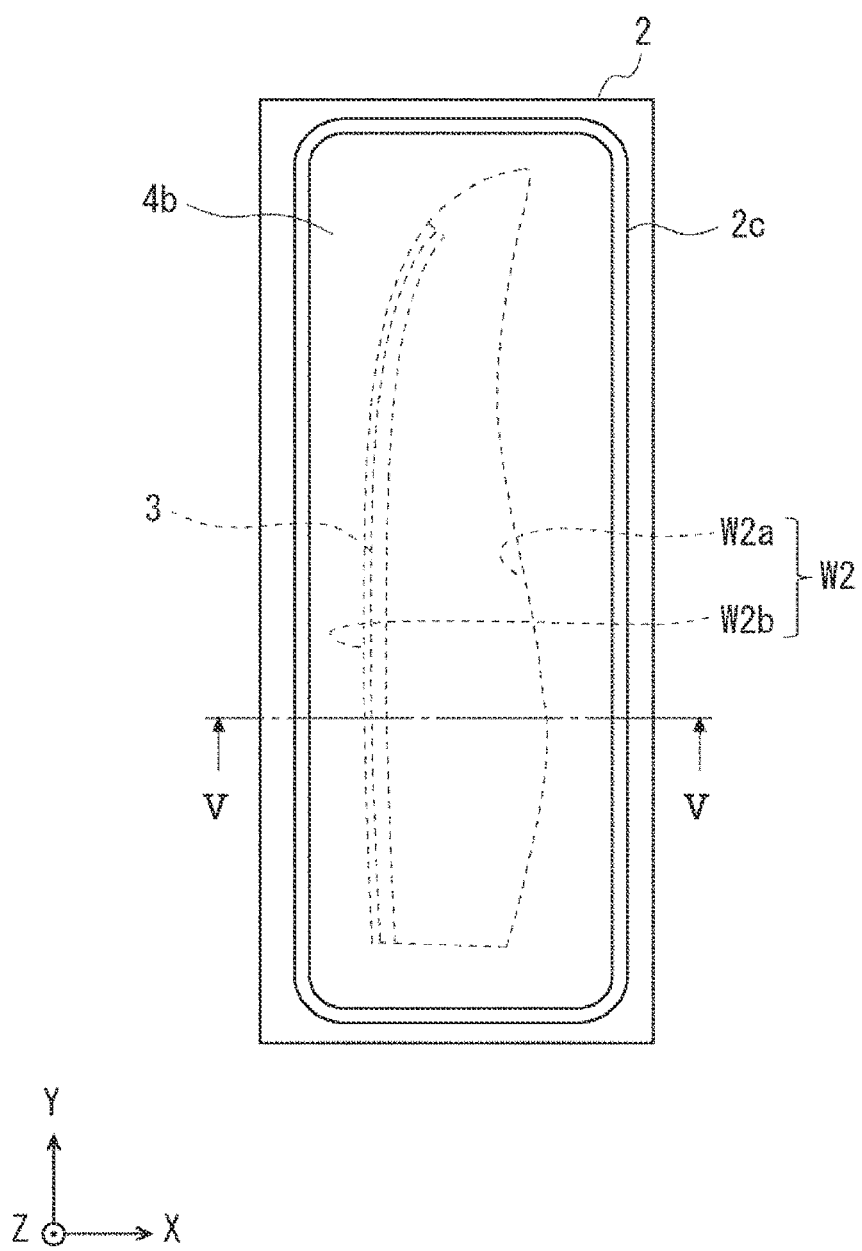
FIG. 4 is a schematic view showing a lower mold in one step of the method for producing a composite molded body according to Embodiment 1.
Figure 5:
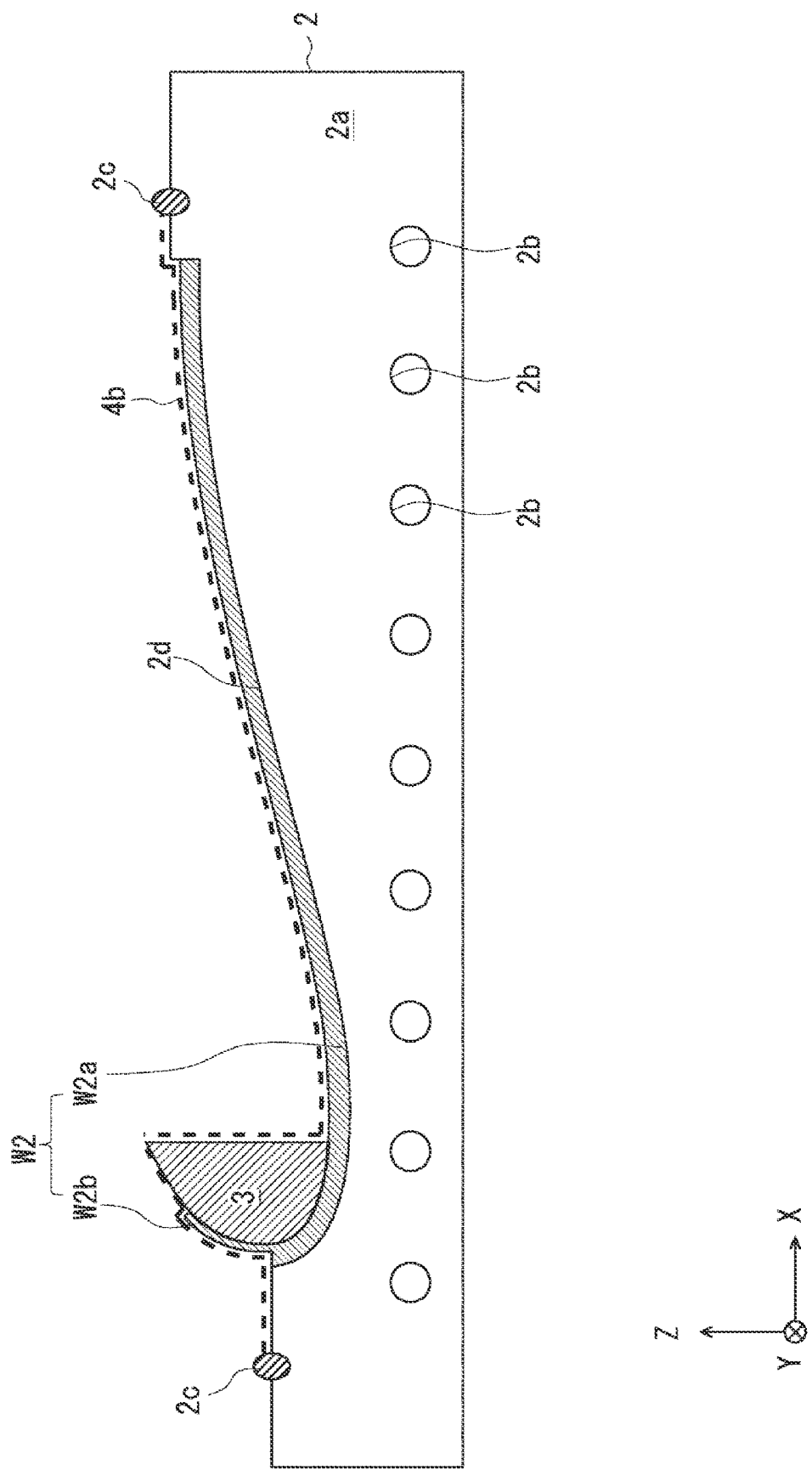
FIG. 5 is a schematic view showing a cross section of a lower mold in one step of the method for producing a composite molded body according to Embodiment 1.
Figure 6:
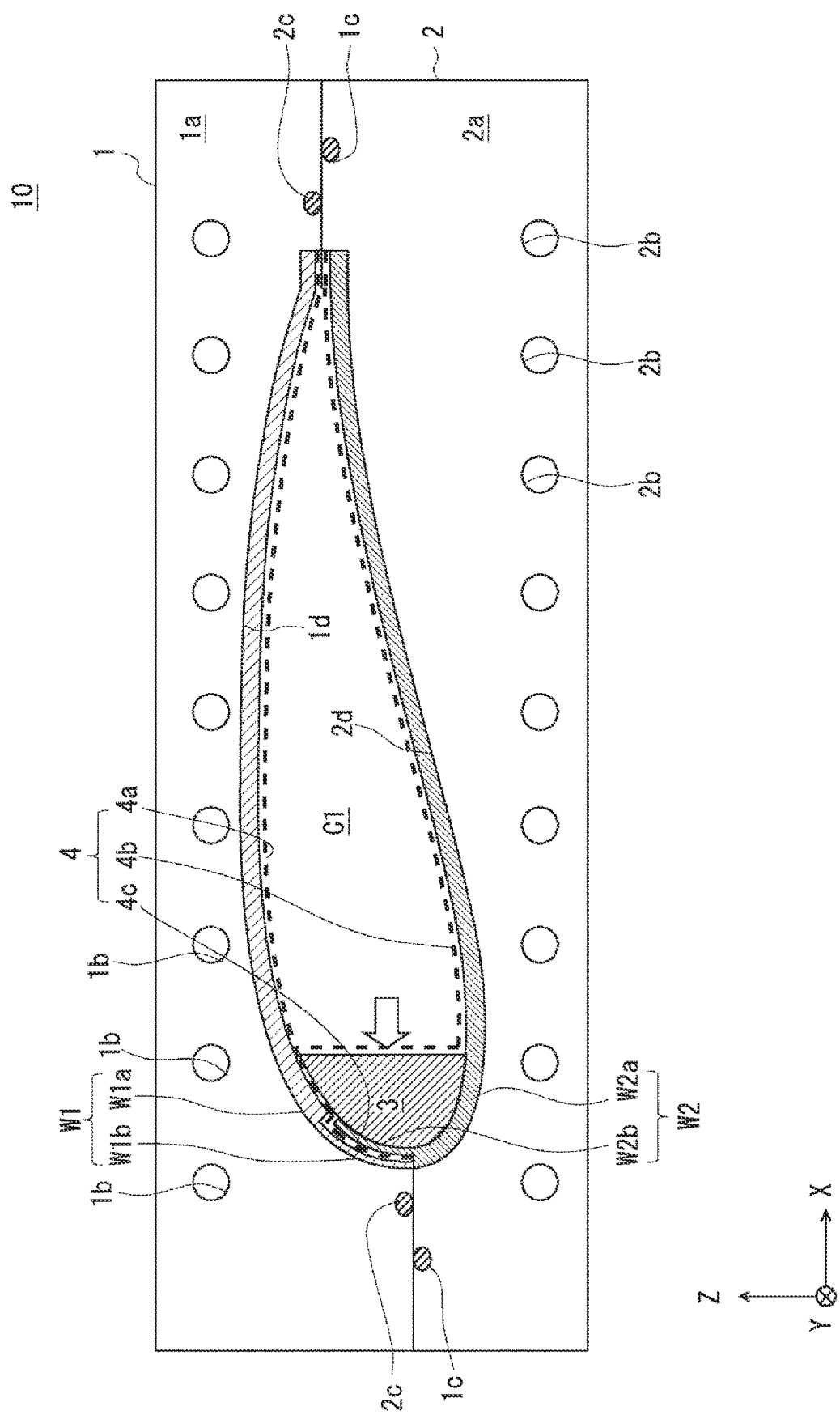
FIG. 6 is a schematic view showing one step of the method for producing a composite molded body according to Embodiment 1.
Figure 7:
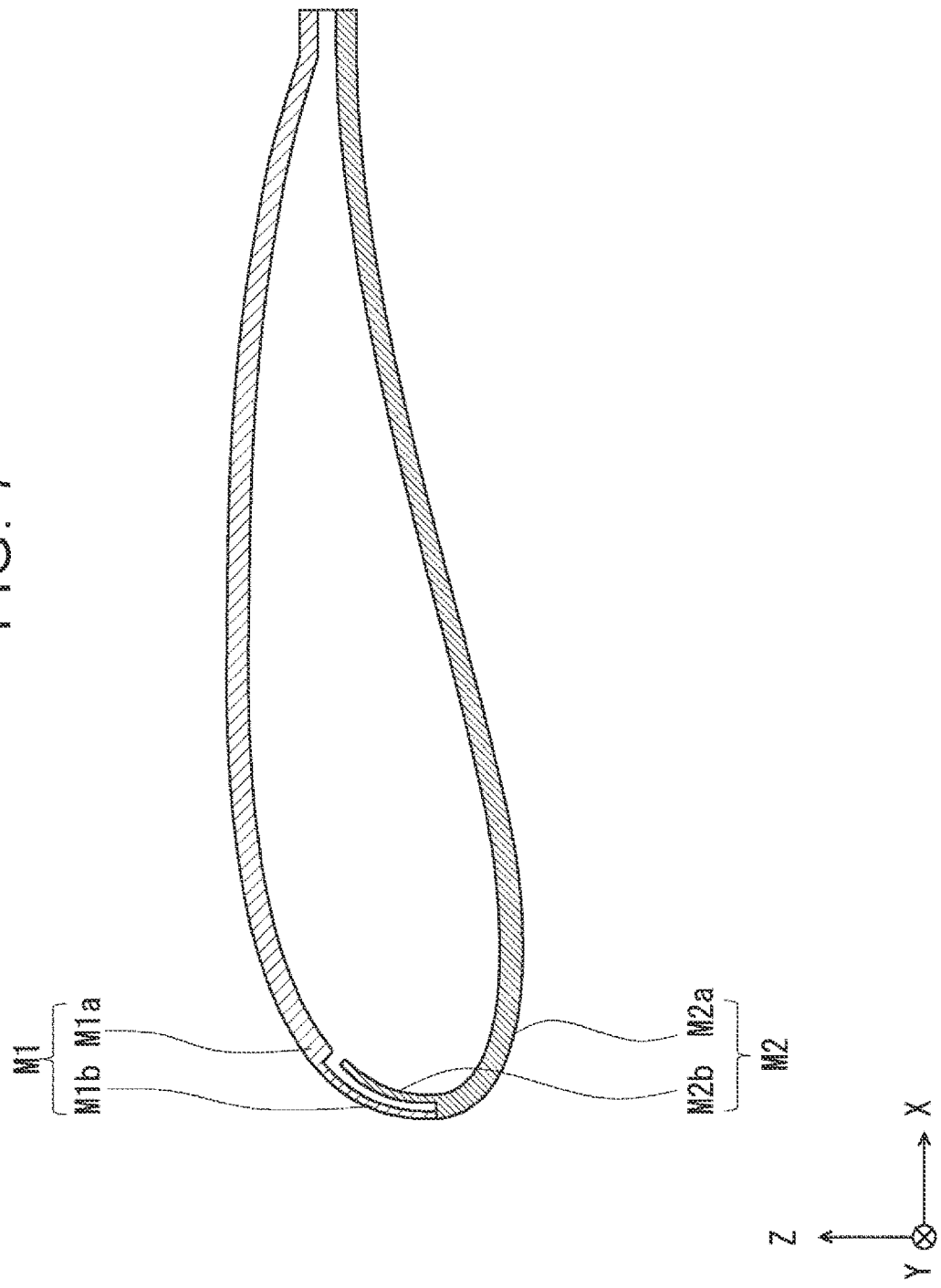
FIG. 7 is a schematic diagram showing a composite molded body.

A method for manufacturing a composite molded body according to Embodiment 1 will be described with reference to FIGS. 1 to 7. The method for producing a composite molded body according to the present embodiment uses a prepreg sheet, but is also applicable to a method of filling and impregnating a reinforcing fiber sheet with a liquid resin in a mold without using a prepreg sheet. Further, the method for producing a composite molded body according to the present embodiment can be carried out without using an autoclave. FIG. 1 is a flowchart showing a method of manufacturing a composite molded body according to Embodiment 1. FIG. 2 is a schematic view showing an upper mold in one step of the method for manufacturing a composite molded body according to Embodiment 1. FIG. 3 is a schematic view showing a cross section of the upper mold shown in FIG. 2. FIG. 4 is a schematic view showing a lower mold in one step of the method for producing a composite molded body according to Embodiment 1. FIG. 5 is a schematic view showing a cross section of the lower mold shown in FIG. 4. FIG. 6 is a schematic view showing one step of the method for producing a composite molded body according to Embodiment 1. FIG. 7 is a schematic view showing a composite molded body.

It should be understood that the right-hand xyz co-ordinates shown in FIG. 2 and the remaining drawings are for convenience of describing the positional relation of the constituent elements. In general, a direction toward a positive side on a Z-axis is a vertically upward direction, an X-Y plane is a horizontal plane, and these are common in the drawings. Note that, in FIG. 2 and FIG. 3, unlike the other drawings, the upper mold 1 and the like, which will be described later, are upside down for ease of viewing. Further, for the sake of visibility, hatching of the upper mold main body 1*a* and the lower mold main body 2*a*, which will be described later, is omitted. The upper film 4*a*, the lower film 4*b*, and the first bag 4, which will be described later, are schematically illustrated using broken lines.

The method for producing a composite molded body according to the present embodiment can be carried out using, for example, the mold 10 shown in FIG. 6. In the process for producing a composite molded body according to the present embodiment, the first and second composite materials W1, W2 are formed, respectively, and the first and second composite molded bodies M1, M2 shown in FIG. 7 are produced. The first composite molded body M1 includes a main body M1*a* and a joint portion M1*b*. The joint portion M1*b* extends from one end of the main body M1*a*. The second composite molded body M2 includes a main body M2*a* and a joint portion M2*b*. The joint portion M1*b* extends from one end of the main body M1*a*. The joint portions M1*b*, M2*b* can be joined to each other. When joint portions M1*b*, M2*b* are joined to each other, a composite material joint body is formed.

The mold 10 includes an upper mold 1 and a lower mold 2. The upper mold 1 is disposed on the upper side of the lower mold 2. Further, the upper mold 1 and the lower mold 2 pushes, or is held so as to be separated.

As shown in FIGS. 2 and 3, the upper mold 1 includes an upper mold main body 1*a*, a temperature control circuit 1*b*, and a sealing 1*c*. The upper mold main body 1*a* has a cavity surface 1*d* and the cavity surface 1*d* has a surface profile that conforms to the first composite molded body M1. The temperature control circuit 1*b* is provided inside the upper mold main body 1*a*. A temperature controller (not shown) flows, discharges, or circulates the heat medium into the temperature control circuit 1*b*. The heating medium is, for example, water, oil, gas, or the like. The heating medium provides heat to the upper mold main body 1*a*, and the temperature of the upper mold 1 reaches a predetermined range and is maintained thereafter. The sealing 1*c* surrounds the cavity surface 1*d* of the upper mold main body 1*a*. The upper mold 1 may have a pipe (not shown). One end of the pipe is open around the cavity surface 1*d*, and the other end of the pipe is connected to a vacuum pump.

As shown in FIGS. 4 and 5, the lower mold 2 includes a lower mold main body 2*a*, a temperature control circuit 2*b*, and a sealing 2*c*. The lower mold main body 2*a* has a cavity surface 2*d*, and the cavity surface 2*d* has a surface profile that conforms to a molded body formed from the second composite molded body M2. The temperature control circuit 2*b* is provided inside the lower mold main body 2*a*. A temperature controller (not shown) flows, discharges, or circulates the heat medium into the temperature control circuit 2*b*. The heating medium applies heat to the lower mold main body 2*a*, and the temperature of the lower mold 2 falls within a predetermined range. The sealing 2*c* surrounds the cavity surface 2*d* of the lower mold main body 2*a*. The lower mold 2 may have a pipe (not shown). One end of the pipe is open around the cavity surface 2*d*, and the other end of the pipe is connected to a vacuum pump. Note that the mold 10 may include means for controlling the temperature of the lower and lower molds 2 and the lower molds 1 by electricity such as a heater, induction heating, or dielectric heating.

First, as shown in FIG. 6, the mandrel 3 and the first bag 4 are disposed in a space C1 sandwiched between the first and second composite materials W1, W2 disposed in the mold 10 (step ST11). This arranged mandrel 3 is sandwiched between the first bag 4 and the to-be-joined portions W1*b*, W2*b* of the first and second composite materials W1, W2. In the method for manufacturing a composite molded body according to the present embodiment, the first bag 4 functions as a pressing portion that presses the mandrel 3.

The first bag 4 includes an upper film 4*a*, a lower film 4*b*, and an end 4*c*. The end 4*c* is inserted between the to-be-joined portions W1*b*, W2*b* of the first and second composite materials. When the gas is supplied into the first bag 4, the first bag 4 is inflated. The gas may utilize a wide variety of gases, such as air. The first bag 4 may be connected to a gas supply source such as a compressor via a pipe (not shown). The pipe is provided with a valve. By opening and closing the valve, gas can be supplied from the gas supply source through the pipe to the first bag 4. The first bag 4 is shaped to follow the inner wall surface of the first and second composite materials W1, W2 since it is evacuating in the cavity when not supplied with gases.

The first and second composite materials W1, W2 are, for example, common prepregs, in which the fibers are impregnated with plastic. The fibers may be composed of carbon fibers, aramid fibers, nylon fibers, polyester fibers, or glass fibers, or any combination thereof, or the like, as a braid, fabric, or knitted fabric. The resin includes a thermosetting resin, and is, for example, an epoxy resin, a bismaleimide resin, a vinyl ester resin, an unsaturated polyester resin, a phenol resin, or a silicone resin.

In the process ST11, specifically, first, as shown in FIGS. 2 and 3, the first composite material W1 is disposed on the cavity surface 1*d* of the upper mold 1. The first composite material W1 includes a main body W1*a* and a to-be-joined portion W1b. The to-be-joined portion W1b extends from one end of the main body W1a. The to-be-joined portion W1b may be thinner than the main body W1a. The main body W1a and the to-be-joined portion W1b respectively correspond to the main body M1a and the joint portion M1b of the first composite molded body M1 shown in FIG. 7.

The upper film 4a is then applied onto the first composite material W1. The application of the upper film 4a onto the first composite material W1 can be carried out, for example, by evacuating the air between the upper film 4a and the first composite material W1 by passing the air through the pipe of the upper mold 1. The upper film 4a may also be affixed onto the upper mold 1 around the first composite material W1.

Subsequently, as shown in FIGS. 4 and 5, the second composite material W2 is disposed on the cavity surface 2d of the lower mold 2. The second composite material W2 includes a main body W2a and a to-be-joined portion W2b. The to-be-joined portion W2b extends from one end of the main body W2a. The to-be-joined portion W2b may be thinner than the main body W2a. The main body W2a and the to-be-joined portion W2b correspond to the main body M2a and the joint portion M2b of the second composite molded body M2 shown in FIG. 7, respectively.

Subsequently, the mandrel 3 is disposed on the second composite material W2, specifically, on the undercut portion in the lower mold main body 2a including the to-be-joined portion W2b. The mandrel 3 has a topography that conforms to the second composite molded body M2. The mandrel 3 has a predetermined elastic modulus or hardness. The mandrel 3 is, for example, a rod-shaped body extending along the Y-axis. The mandrel 3 may have a higher hardness compared to the first bag 4. The mandrel 3 according to the present embodiment is made of aluminum or an aluminum alloy, but the mandrel 3 may be made of another material, for example, a silicon resin.

Subsequently, the lower film 4b is applied to the second composite material W2 and the mandrel 3. The bonding may be performed by, for example, using the above-described vacuum pumping, evacuating air between the lower film 4b and the second composite material W2 and between the lower film 4b and the mandrel 3 through the pipe of the above-described lower mold 2.

Subsequently, the upper mold 1 and the lower mold 2 are pressed together so that the cavity surface 1d and the cavity surface 2d face each other. In other words, the upper mold 1 and the lower mold 2 are clamped. The upper film 4a and the lower film 4b are then bonded together to form the first bag 4. At this time, in order to prevent the upper mold 1 and the lower mold 2 from being opened with respect to the subsequent application of pressure to the first bag 4, the upper mold 1 and the lower mold 2 are clamped and held by a necessary force by a mold clamping device such as a press (not shown) or a bolt.

Subsequently, the first bag 4 is inflated, and the mandrel 3 is pressed against the to-be-joined portion W2b (step ST12).

Specifically, gas is supplied to the inside of the first bag 4 and pressurized. Then, the first bag 4 is inflated, and the mandrel 3 is pressed toward W2b of the to-be-joined portion (here, the X-axis negative direction). When the first bag 4 is in close contact with the normal shape of the cavity in the evacuated condition, the gas is supplied to the inside of the first bag 4, and pressurizing the inside of the first bag 4, the first bag 4 hardly expands in shape, but presses the mandrel 3 to the to-be-joined portion W2b side (here, the X-axis negative direction). Thus, the mandrel 3 is pressed against the to-be-joined portion W2b. Further, the end 4c of the first bag 4 is inflated and pushes against the to-be-joined portions W1b and W2b. The end 4c of the first bag 4 presses and forms the to-be-joined portion W1b against the cavity surface 1d of the upper mold 1. Further, the end 4c of the first bag 4 and the mandrel 3 sandwich the to-be-joined portion W2b is molded. The pressure experienced by the to-be-joined portions W1b and W2b by the mandrel 3 and the first bag 4 may be equivalent to the pressure experienced by the composite material when the composite is molded using a common autoclave. The first and second composite materials W1, W2 are heated and cured using a temperature controller. More specifically, since the to-be-joined portion W2b is heated while being pressed from the mandrel 3, the resin included in the to-be-joined portion W2b is cured. Further, the to-be-joined portion W1b is heated while being pressed from the end 4c of the first bag 4, so that the resin included in the to-be-joined portion W1b is cured. Consequently, the first composite molded body M1 and the second composite molded body M2 shown in FIG. 7 are formed.

The resin included in the to-be-joined portion W1b and the to-be-joined portion W2b may be appropriately set. The resin-containing resin-to-be-joined portion W1b and the to-be-joined portion W2b may be cured until semi-cured. Here, the semi-cured state is a state in which functional groups remain on the surfaces of the first composite molded body M1 and the second composite molded body M2, and for example, the degree of cure of the resin of the first composite molded body M1 and the resin of the second composite molded body M2 is about 60 to 80% (preferably, 70%).

However, the curing degree of the resin of the first composite molded body M1 and the second composite molded body M2 can be appropriately set in view of the degree of occurrence of wrinkles in the resin of the first composite molded body M1 and the resin of the second composite molded body M2, the first composite molded body M1, and the second composite molded body M2. The degree of cure can be measured, for example, based on a heat flow curve obtained by differential scanning calorimetry (DSC).

As described above, the first composite material W1 and the second composite material W2 can be formed to produce the first and second composite molded bodies M1, M2, respectively.

According to the manufacturing process of the composite molded body according to the present embodiment, the first bag 4 presses the mandrel 3 against the to-be-joined portion W2b of the second composite material W2, and the second composite molded body M2 is manufactured. The joint portion M2b of the second composite molded body M2 has a high-profile accuracy. Therefore, it is possible to improve the geometric accuracy of the joint portions M1b, M2b of the first and second composite molded bodies M1, M2. Further, the first and second composite molded bodies M1, M2 without using an autoclave, while molding by applying the same pressure as the autoclave, it is possible to improve the geometric accuracy of the joint portions M1b, M2b of the first and second composite molded bodies M1, M2.

In addition, the first bag 4 is inflated to press the mandrel 3 against the to-be-joined portion W2b of the second composite material W2 of various shapes. Therefore, the second composite material W2 having various shapes can be formed, and the joint portion M2b of the second composite molded body M2 having high shape accuracy can be formed.

Further, the end 4c of the first bag 4 is inflated to press the to-be-joined portion W1b of the first composite material W1 against the cavity surface 1d of the upper mold 1. In this way, it is possible to form the joint portion M1b of the first composite molded body M1 with high shape accuracy.

Second Embodiment

Figure 8:
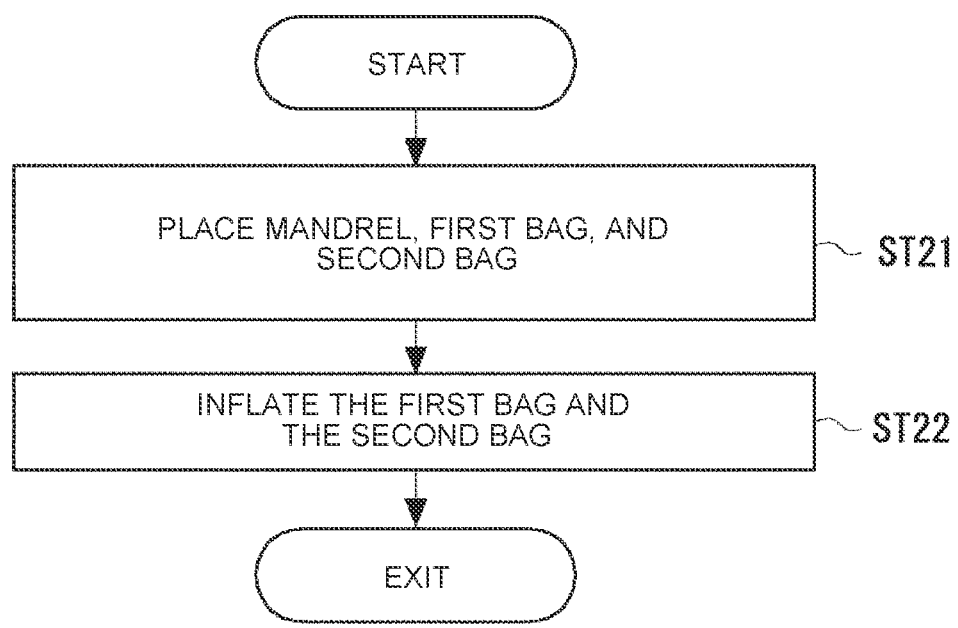
FIG. 8 is a flowchart illustrating a method of manufacturing a composite molded body according to Embodiment 2.
Figure 9:
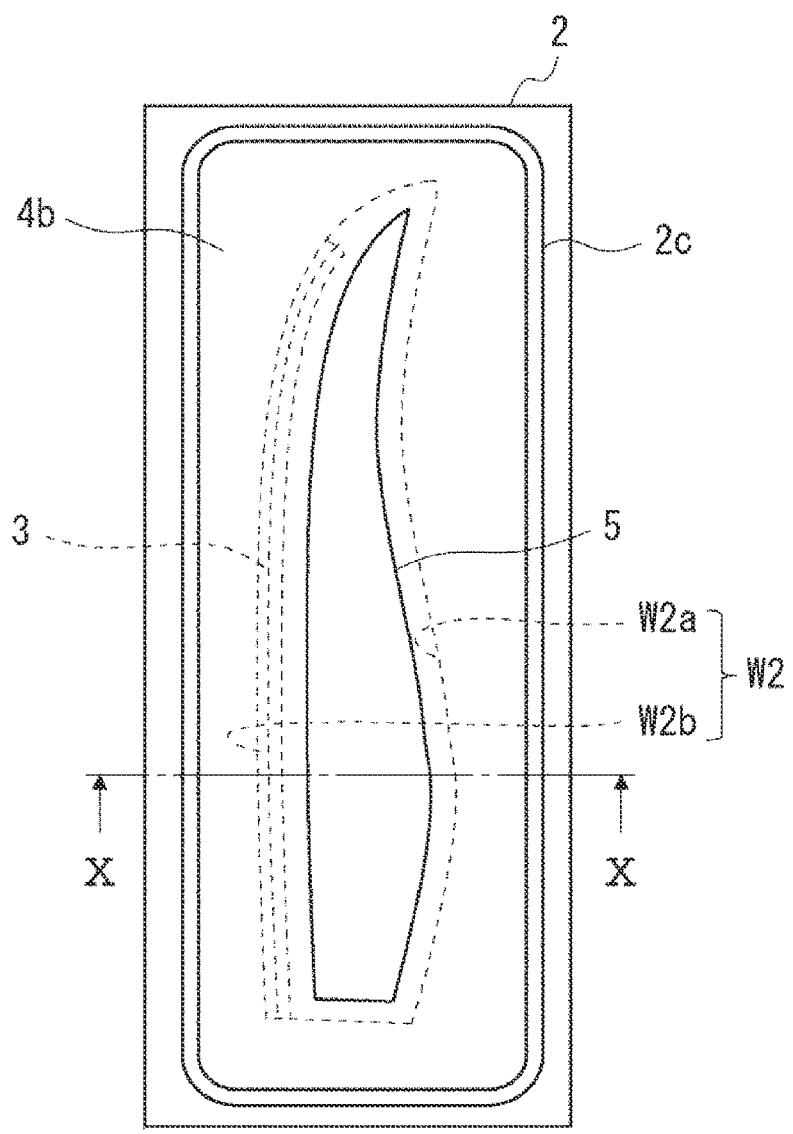
FIG. 9 is a schematic view showing a lower mold in one step of the method for producing a composite molded body according to Embodiment 2.
Figure 10:
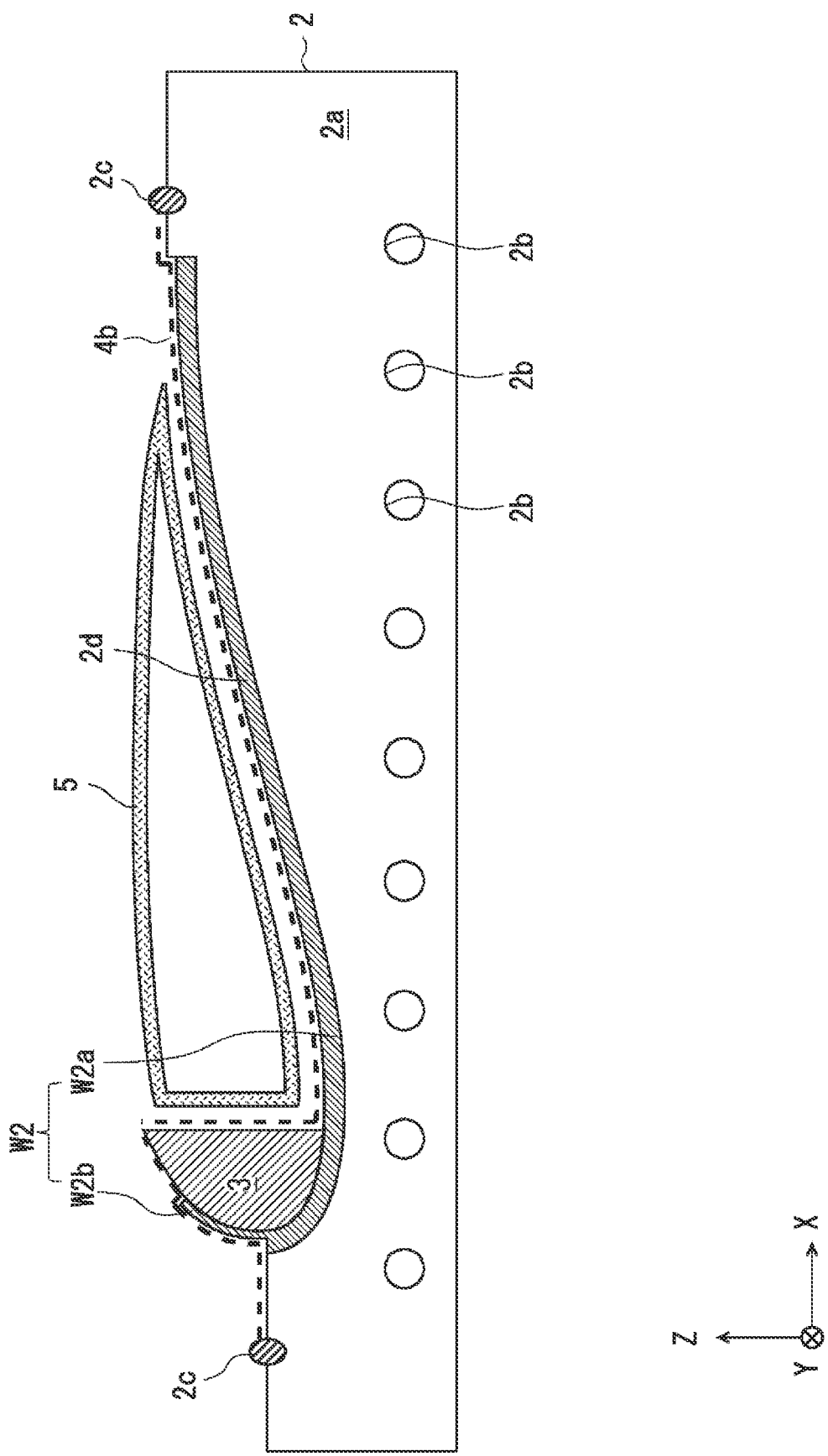
FIG. 10 is a schematic view showing a cross section of a lower mold in one step of the method for producing a composite molded body according to Embodiment 2.
Figure 11:
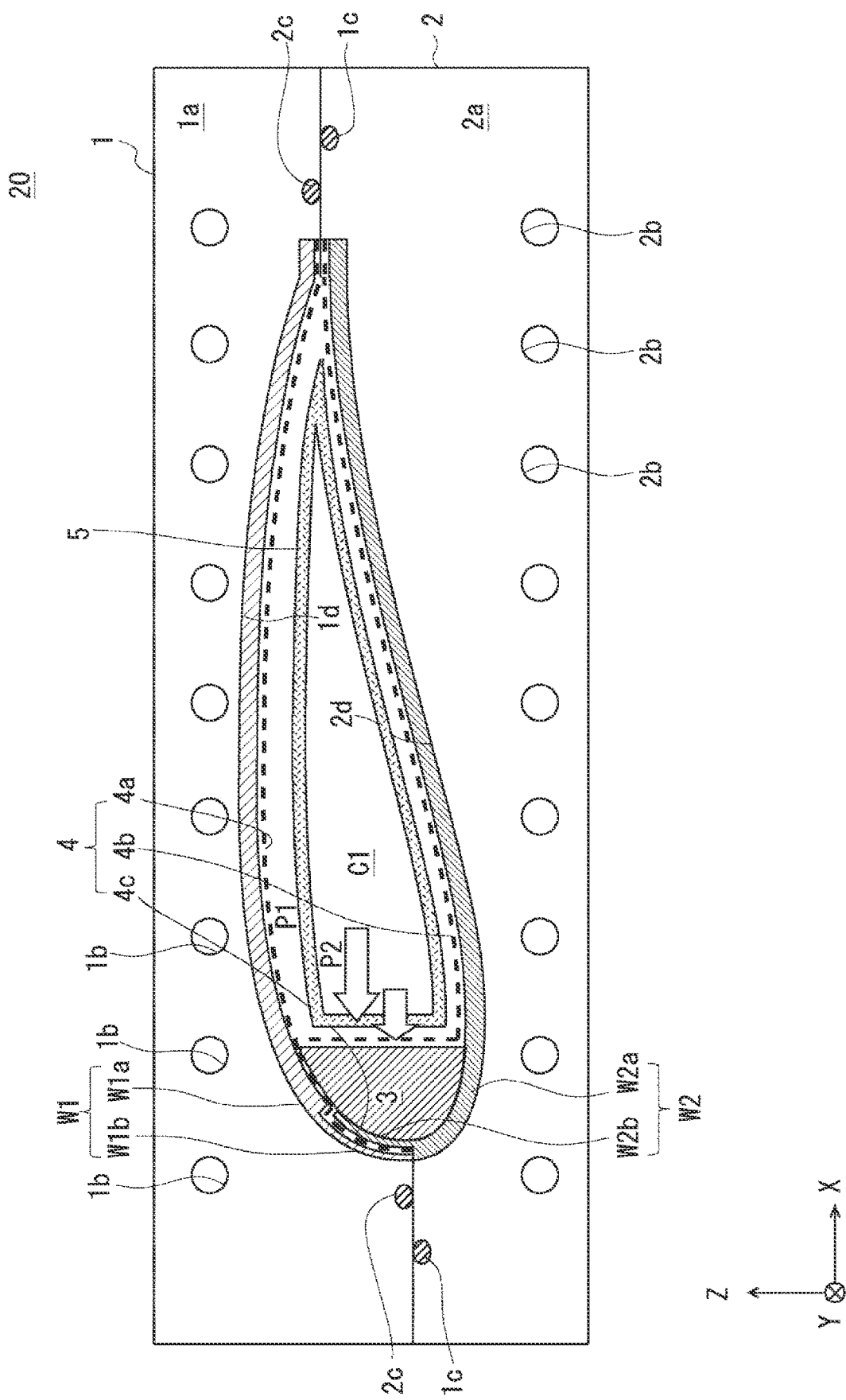
FIG. 11 is a schematic view showing one step of the method for producing a composite molded body according to Embodiment 2.

A method for manufacturing a composite molded body according to Embodiment 2 will be described with reference to FIGS. 8 to 11. FIG. 8 is a flowchart showing a method of manufacturing a composite molded body according to Embodiment 2. FIG. 9 is a schematic view showing a lower mold in one step of the method for producing a composite molded body according to Embodiment 2. FIG. 10 is a schematic view showing a cross section of the lower mold shown in FIG. 9. FIG. 11 is a schematic view showing one step of the method for producing a composite molded body according to Embodiment 2.

The method for producing a composite molded body according to the present embodiment can be carried out using, for example, the mold 20 shown in FIG. 11.

The mold 20 comprises the same configuration as the mold 10 shown in FIG. 6, except that it comprises a second bag 5. The second bag 5 is arranged inside the first bag 4. When the gas is supplied into the second bag 5, the second bag 5 inflates in the same way as the first bag 4. The second bag 5 is connected to a gas supply source such as a compressor via a pipe (not shown). The pipe is provided with a valve. By opening and closing the valve, gas is supplied from the gas supply source through the pipe to the second bag 5. The second bag 5 may have a shape that conforms to the inner wall surface of the first bag 4 when no gas is supplied.

First, as shown in FIG. 11, the mandrel 3, the first bag 4, and the second bag 5 are arranged in a space C1 sandwiched between the first and second composite materials W1, W2 arranged in the mold 20 (step ST21). This arranged mandrel 3 is sandwiched between the first bag 4 and the to-be-joined portions W1b, W2b of the first and second composite materials W1, W2. In the method for manufacturing a composite molded body according to the present embodiment, the first bag 4 and the second bag 5 function as a pressing portion that presses the mandrel 3.

Specifically, as in the process ST11 shown in FIG. 1, the respective components are arranged in the upper mold 1. That is, as shown in FIGS. 2 and 3, the first composite material W1 is disposed on the cavity surface 1d of the upper mold 1. The upper film 4a is then applied onto the first composite material W1.

Subsequently, as shown in FIGS. 9 and 10, the second composite material W2 is disposed on the cavity surface 2d of the lower mold 2. Subsequently, the mandrel 3 is disposed on the second composite material W2, specifically, on a portion including the to-be-joined portion W2b. Subsequently, the lower film 4b is applied to the second composite material W2 and the mandrel 3.

Subsequently, the second bag 5 is placed on the lower film 4b. The mandrel 3 is sandwiched between the second bag 5 and the to-be-joined portion W2b of the second composite material W2.

Subsequently, the upper mold 1 and the lower mold 2 are pressed together so that the cavity surface 1d and the cavity surface 2d face each other. In other words, the upper mold 1 and the lower mold 2 are clamped. The upper film 4a and the lower film 4b are then bonded together to form the first bag 4. At this time, the upper mold 1 and the lower mold 2 are clamped and held with a necessary force by a mold clamping device such as a press (not shown) or a bolt so that the mold does not open with respect to the subsequent application of pressure to the first bag 4 and the second bag 5.

Subsequently, the first bag 4 and the second bag 5 are inflated, and the mandrel 3 is pressed against the to-be-joined portion W2b (step ST22).

Specifically, gas is supplied to the inside of the first bag 4 and pressurized. Further, gas is supplied to the inside of the second bag 5 and pressurized. The pressurization of the inside of the first bag 4 and the pressurization of the inside of the second bag 5 may be performed substantially simultaneously. Also, the pressure P2 in the second bag 5 may be greater than the pressure P1 in the first bag 4. Then, the first bag 4 and the second bag 5 are inflated, and the mandrel 3 is pressed toward the to-be-joined portion W2b side (here, the X-axis negative direction). Thus, the mandrel 3 is pressed against the to-be-joined portion W2b. The first and second composite materials W1, W2 are heated using a temperature controller. More specifically, since the to-be-joined portion W2b is heated while being pressed from the mandrel 3, the resin included in the to-be-joined portion W2b is cured. Further, the to-be-joined portion W1b is heated while being pressed from the end 4c of the first bag 4, so that the resin included in the to-be-joined portion W1b is cured. Consequently, the first composite molded body M1 and the second composite molded body M2 shown in FIG. 7 are formed.

As described above, the first composite material W1 and the second composite material W2 can be formed to produce the first and second composite molded bodies M1, M2, respectively.

According to the manufacturing process of the composite molded body according to the present embodiment, the second bag 5 is inflated with respect to the force that the mandrel 3 is pushed back by the inflation of the end 4c of the first bag 4, so that the to-be-joined portion W2b is pressed more strongly against the to-be-joined portion W1b. Therefore, it is possible to improve the geometric accuracy of the joint portion M2b of the second composite molded body M2.

Example 1

Figure 12:
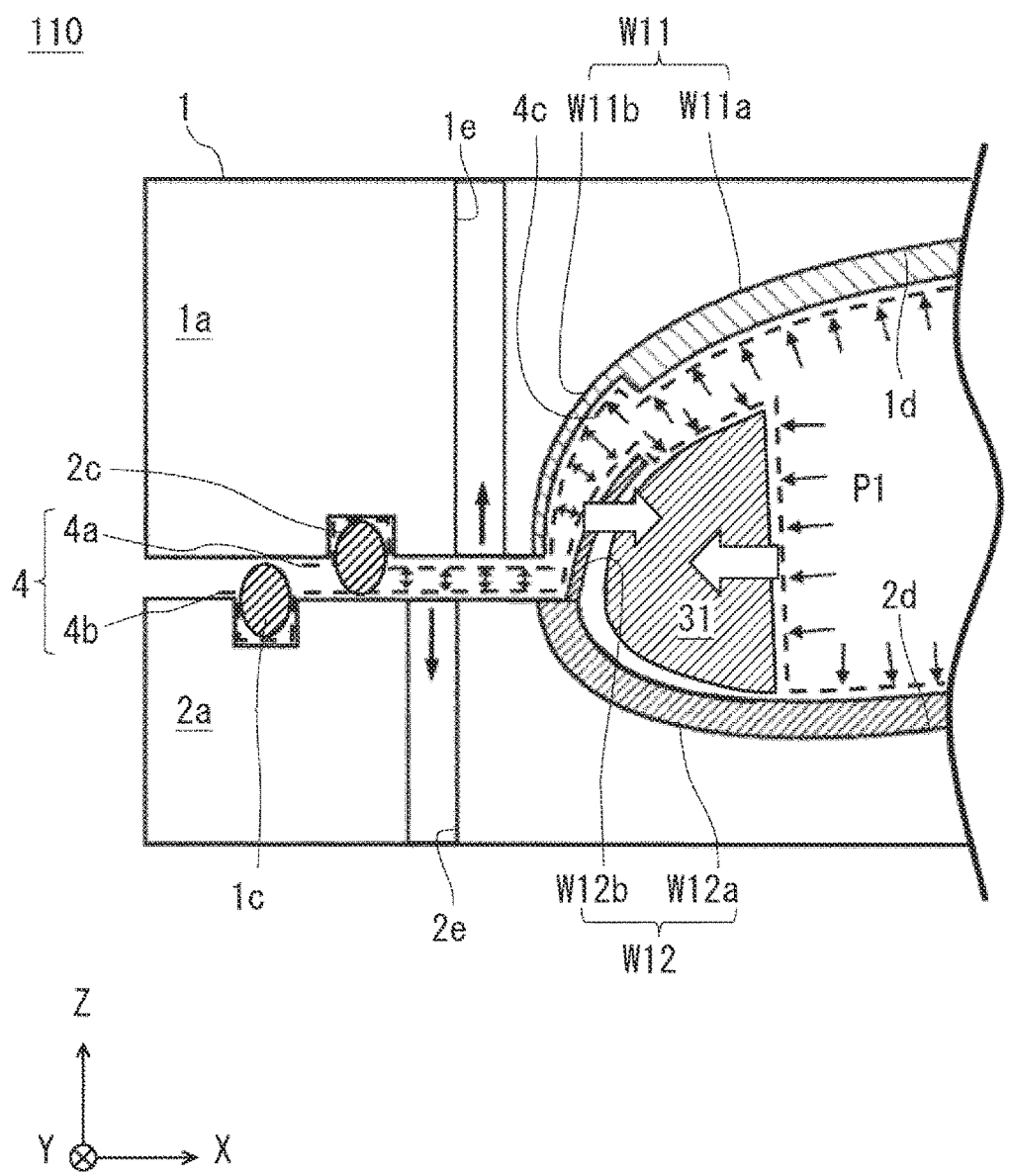
FIG. 12 is a schematic view showing a specific example of one step of the method for producing a composite molded body according to Embodiment 1.

Next, with reference to FIG. 12, a specific example of a method for producing a composite molded body according to Embodiment 1 will be described. FIG. 12 is a schematic view showing a specific example of one step of the method for producing a composite molded body according to Embodiment 1.

As shown in FIG. 12, the mold 110 has the same configuration as the mold 10 shown in FIG. 6 except for the pipes 1e, 2e and the mandrel 31. In FIG. 12, the upper film 4a and the lower film 4b are separated from each other for the sake of clarity, but the upper film 4a and the lower film 4b are bonded to each other as in the case of the mold 10 shown in FIG. 6, and the first bag 4 is formed.

One end of the pipe 1e is open around the cavity surface 1d, and the other end of the pipe 1e is connected to a vacuum pump (not shown). The vacuum-pump can be used to evacuate air between the upper film 4a and the first composite material W11 through a pipe 1e to affix the upper film 4a to the second composite material W12 and the mandrel 31.

Similarly, one end of the pipe 2e is open around the cavity surface 2d, and the other end of the pipe 2e is connected to a vacuum pump (not shown). The vacuum pump can be used to affix the lower film 4b to the second composite material W12 and the mandrel 31 by evacuating air between the lower film 4b and the second composite material W12 and between the lower film 4b and the mandrel 31 through the pipe 2e.

The mandrel 31 is made of a silicone resin material.

Similar to the mold 10 shown in FIG. 6, the method for manufacturing the composite molded body according to Embodiment 1 can be performed using the mold 110.

Example 2

Figure 13:
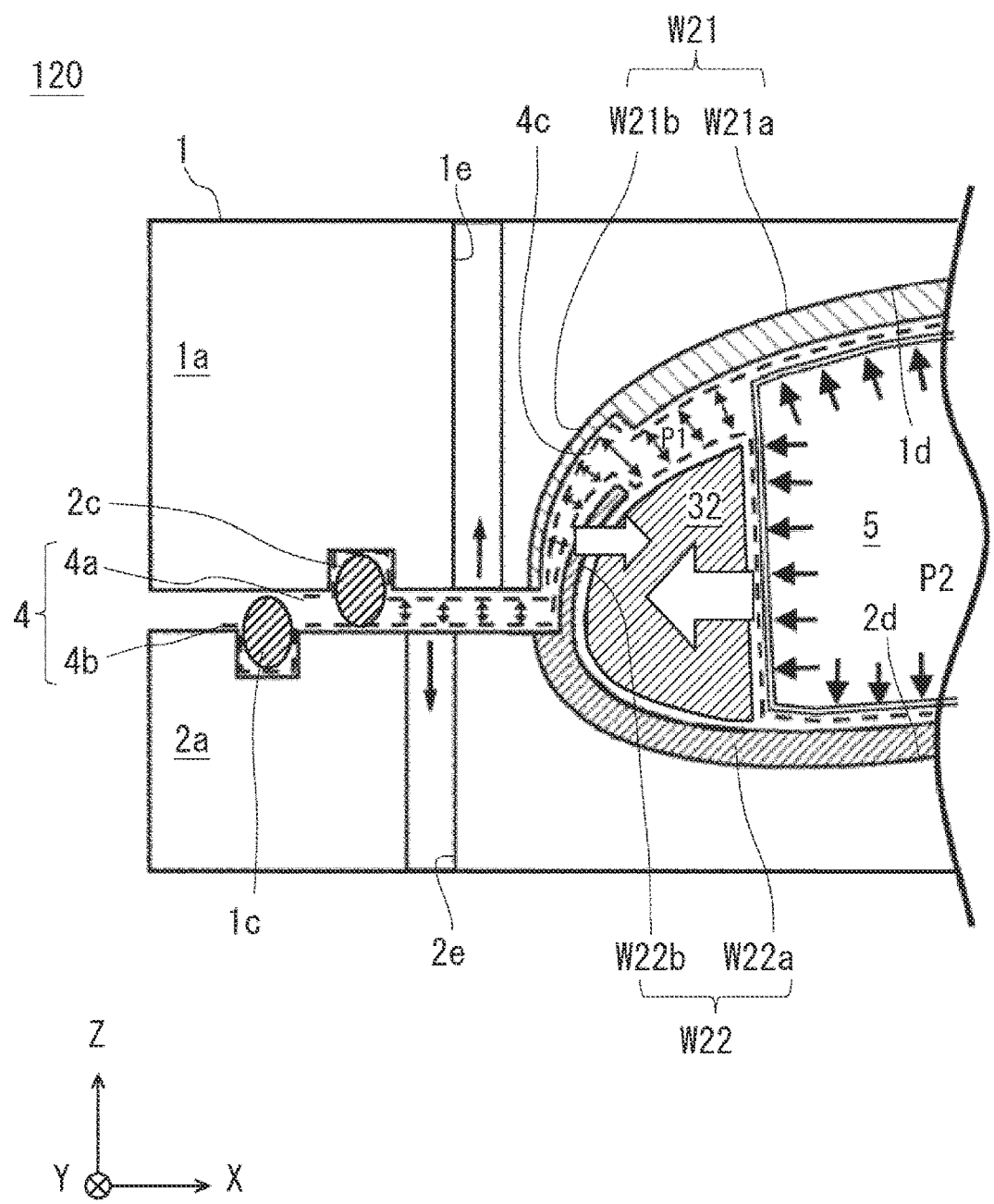
FIG. 13 is a schematic view showing a specific example of one step of the method for producing a composite molded body according to Embodiment 2.

Next, with reference to FIG. 13, a specific example of a method for producing a composite molded body according to Embodiment 2 will be described. FIG. 13 is a schematic view showing a specific example of one step of the method for producing a composite molded body according to Embodiment 2.

The mold 120 has the same configuration as the mold 20 shown in FIG. 11 except for the pipes 1e, 2e and the mandrel 32. In FIG. 13, for the sake of clarity, the upper film 4a and the lower film 4b are separated from each other, but in reality, the upper film 4a and the lower film 4b are bonded to each other in the same manner as the mold 10 shown in FIG. 11, and the first bag 4 is formed.

The mandrel 32 is made of pure aluminum or an aluminum alloy. The mandrel 32 has a higher elastic modulus or hardness than the mandrel 31 shown in FIG. 12.

Similar to the mold 20 shown in FIG. 11, the method of manufacturing the composite molded body according to the second embodiment can be performed using the mold 120.

Here, a difference between a specific example of the method of manufacturing the composite molded body according to the second embodiment using the mold 120 and a specific example of the method of manufacturing the composite molded body according to the first embodiment using the mold 110 will be described. As described above, the mandrel 32 has a higher elastic modulus or hardness than the mandrel 31 shown in FIG. 12. Therefore, the shape accuracy of the joint portion M2b of the second composite molded body M2 formed by molding the second composite material W22 is higher than the shape accuracy of the joint portion M2b of the second composite molded body M2 formed by molding the second composite material W12. Therefore, a specific example of the method for producing a composite molded body according to Embodiment 2 using the mold 120 can produce a second composite molded body M2 having a joint portion M2b with higher shape accuracy than a specific example of the method for producing a composite molded body according to Embodiment 1 using the mold 110.

In addition, in the process ST22, since the second bag 5 is inflated by the pressure P2 higher than the pressure P1 of the first bag 4, the to-be-joined portion W2b is pressed more strongly from the second bag 5 against the force that the mandrel 3 is pushed back from the end 4c of the first bag against the to-be-joined portion W1b. Therefore, the position of the mandrel 32 in the mold 120 is more stable than the position of the mandrel 31 in the mold 110. Therefore, a specific example of the method of manufacturing the composite molded body according to the second embodiment using the mold 120 is more stable in the position of the mandrel 32 than a specific example of the method of manufacturing the composite molded body according to the first embodiment using the mold 110. Therefore, the shape accuracy of the joint portion M2b of the second composite molded body M2 is stable.

Third Embodiment

Figure 14:
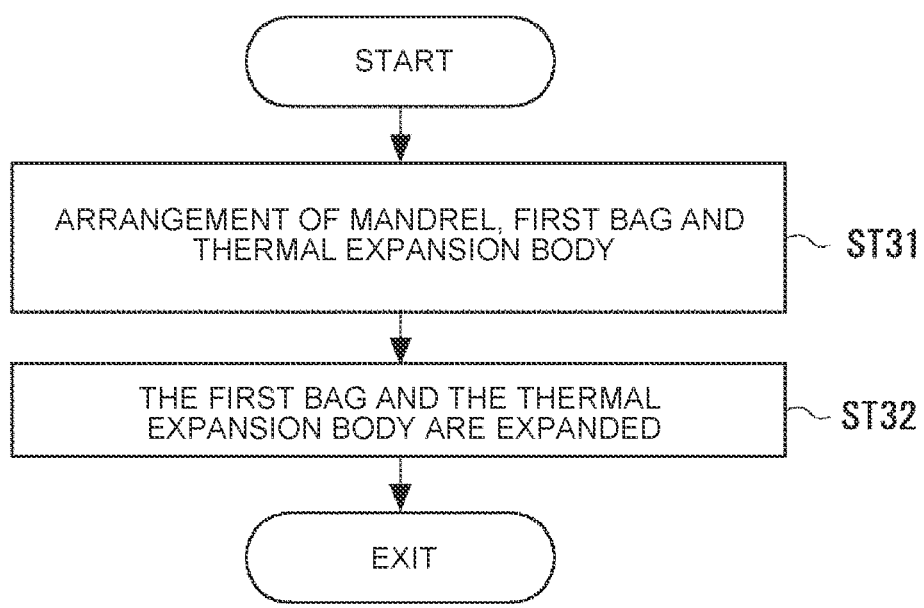
FIG. 14 is a flowchart illustrating a method of manufacturing a composite molded body according to Embodiment 3.
Figure 15:
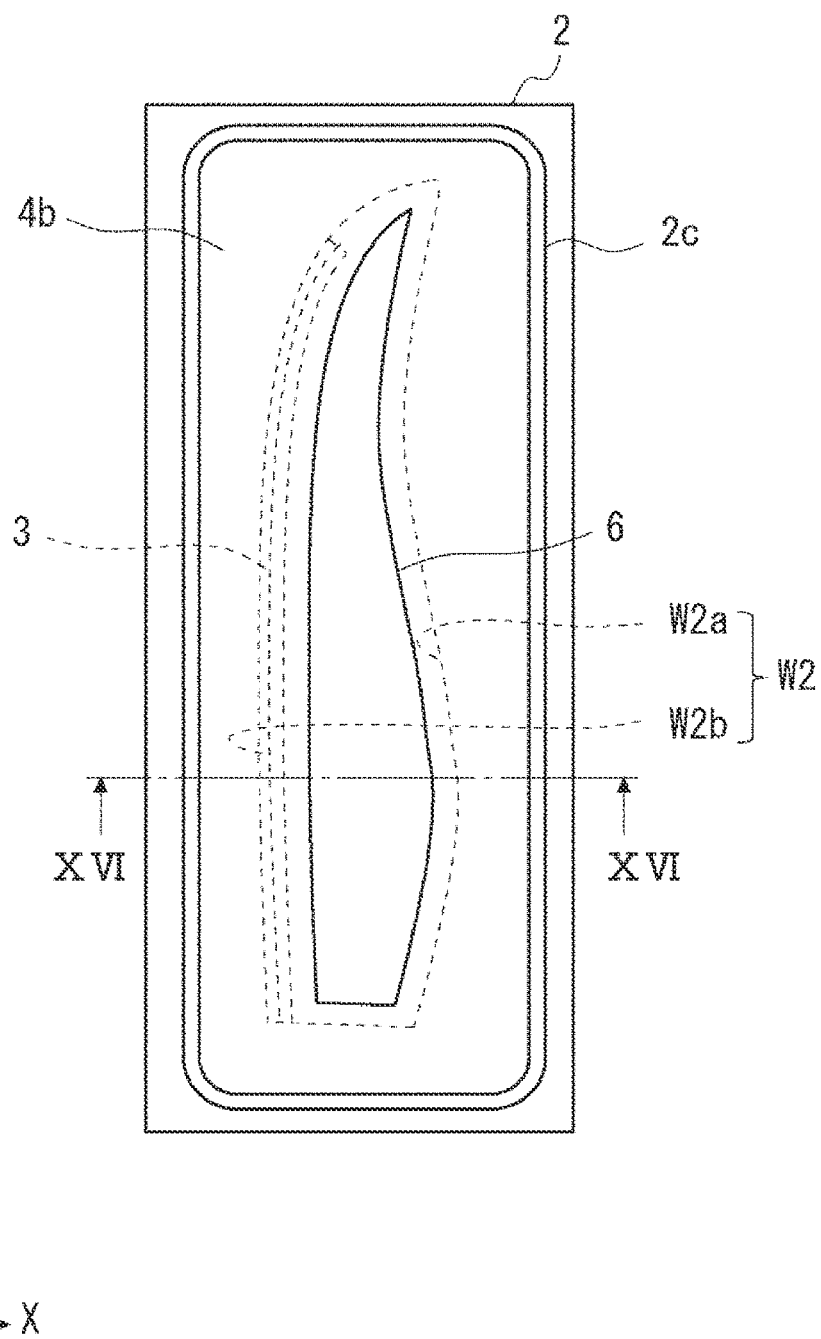
FIG. 15 is a schematic view showing a lower mold in one step of the method for producing a composite molded body according to Embodiment 3.
Figure 16:
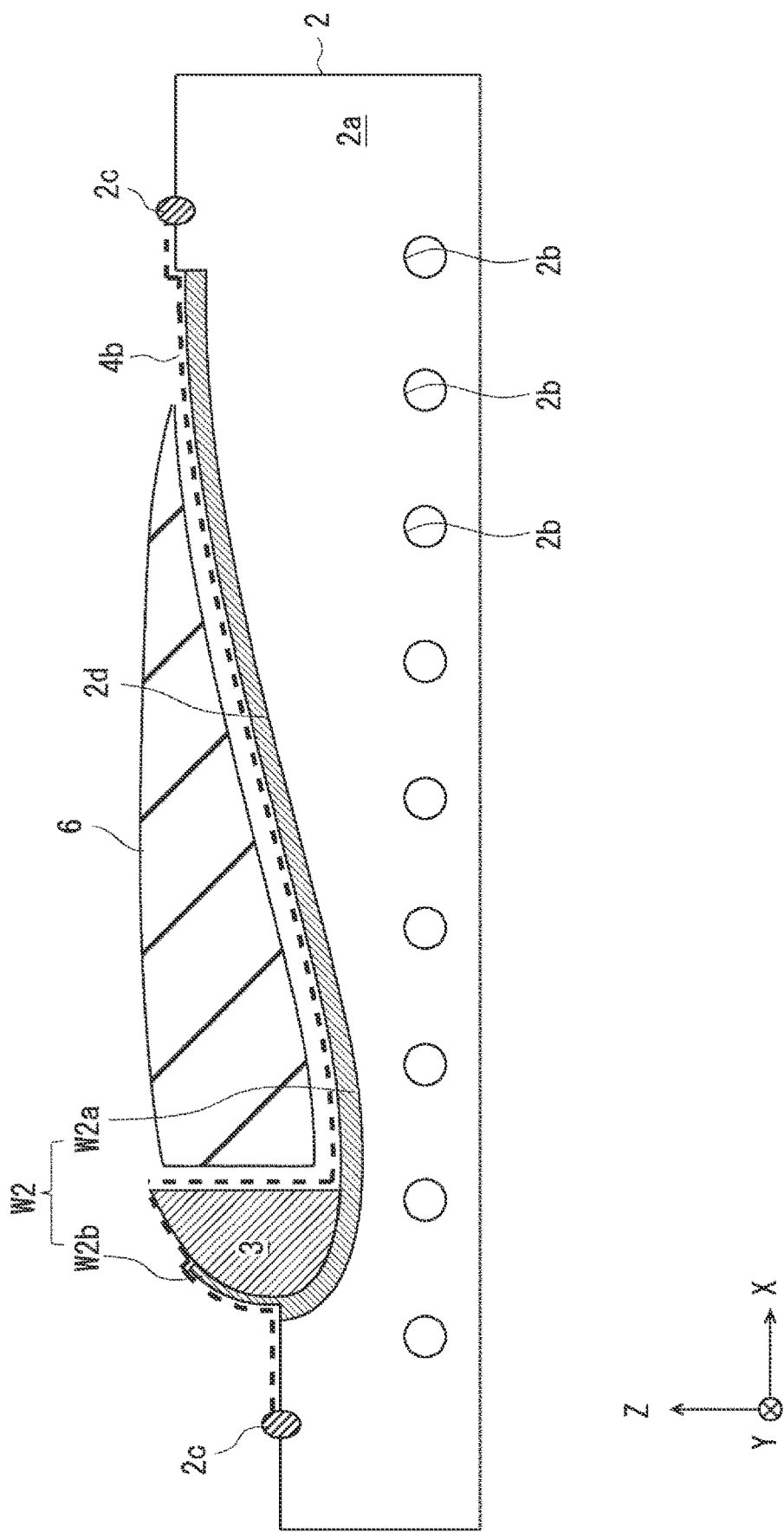
FIG. 16 is a schematic view showing a cross section of a lower mold in one step of the method for producing a composite molded body according to Embodiment 3.
Figure 17:
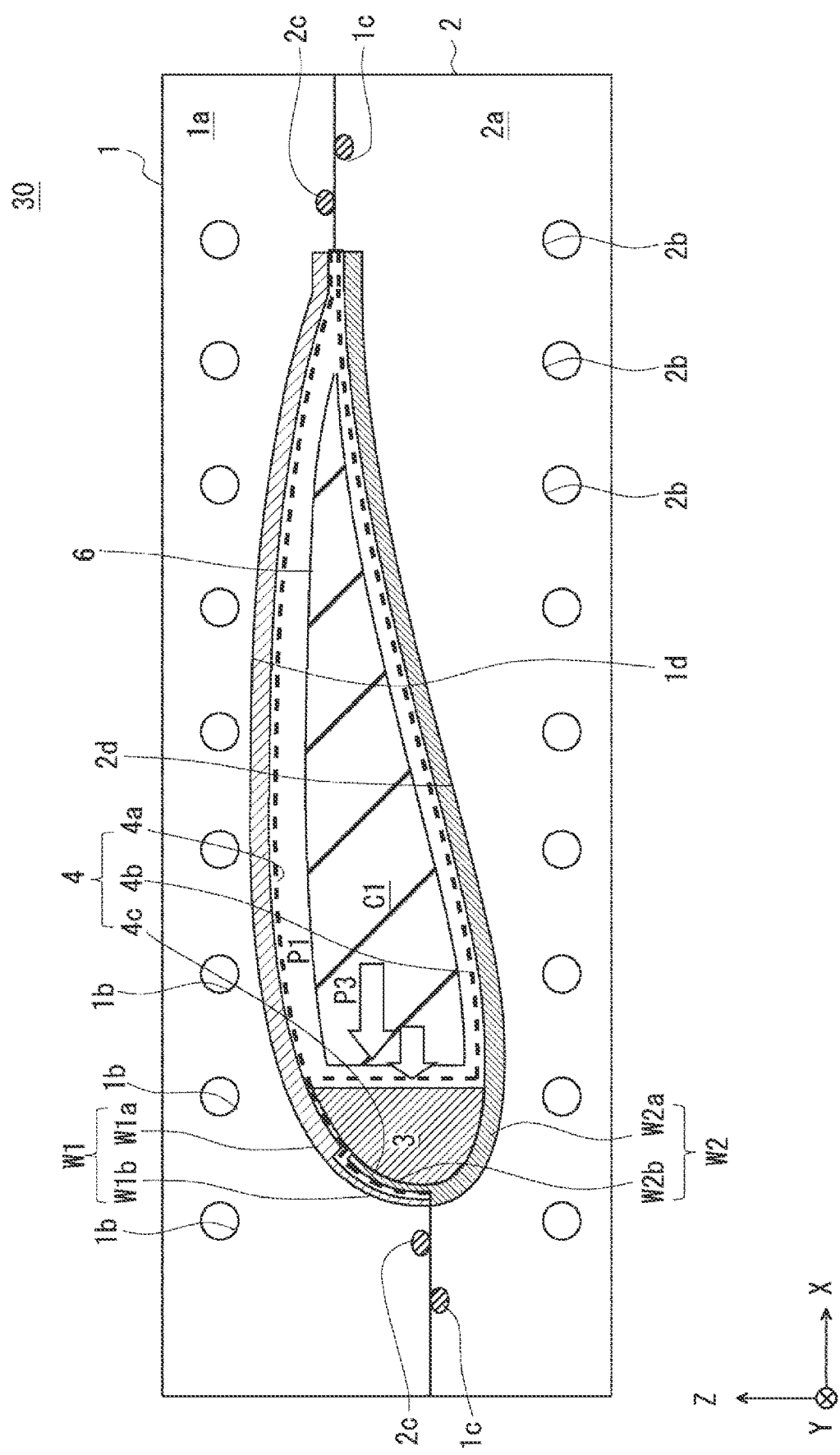
FIG. 17 is a schematic view showing one step of the method for producing a composite molded body according to Embodiment 3.

A method of manufacturing the composite molded body according to the third embodiment will be described with reference to FIGS. 14 to 17. FIG. 14 is a flowchart illustrating a method of manufacturing a composite molded body according to Embodiment 3. FIG. 15 is a schematic view showing a lower mold in one step of the method for producing a composite molded body according to Embodiment 3. FIG. 16 is a schematic view showing a cross section of the lower mold shown in FIG. 15. FIG. 17 is a schematic view showing one step of the method for producing a composite molded body according to Embodiment 3.

The method for producing a composite molded body according to the present embodiment can be carried out using, for example, the mold 30 shown in FIG. 17.

The mold 30 has the same configuration as the mold 20 shown in FIG. 11, except that it is provided with a thermal expansion body 6 rather than a second bag 5.

The thermal expansion body 6 may be made of a material that thermally expands. The thermal expansion body 6 is made of, for example, a silicone rubber material. The thermal expansion body 6 may be thermally expanded by being supplied with heat as appropriate. The thermal expansion body 6 may be provided with, for example, a heating wire electrically connected to a power source. Thermal expansion body 6, when placed in a room temperature environment, i.e., is not given heat, if not thermally expanded, it may have a configuration that follows the inner wall surface of the first and second composite materials W1, W2. In the method for manufacturing a composite molded body according to the present embodiment, the thermal expansion body 6 functions as a pressing portion that presses the mandrel 3. The thermal expansion body 6 does not have to be hollow like a bag, but is solid. The thermal expansion body 6 has a simpler configuration than a bag such as the second bag 5.

First, as shown in FIG. 17, the mandrel 3, the first bag 4, and the thermal expansion body 6 are disposed in a space C1 sandwiched between the first and second composite materials W1, W2 disposed in the mold 30 (step ST31). The disposed mandrel 3 is sandwiched between the first bag 4, the thermal expansion body 6, and the to-be-joined portions W1b, W2b of the first and second composite materials W1, W2. In the method for manufacturing a composite molded body according to the present embodiment, the first bag 4 and the thermal expansion body 6 function as a pressing portion that presses the mandrel 3.

Specifically, as in the process ST11 shown in FIG. 1, the respective components are arranged in the upper mold 1. That is, as shown in FIGS. 2 and 3, the first composite material W1 is disposed on the cavity surface 1d of the upper mold 1. The upper film 4a is then applied onto the first composite material W1.

Subsequently, as shown in FIGS. 15 and 16, the second composite material W2 is disposed on the cavity surface 2d of the lower mold 2. Subsequently, the mandrel 3 is disposed on the second composite material W2, specifically, on a portion including the to-be-joined portion W2b. Subsequently, the lower film 4b is applied to the second composite material W2 and the mandrel 3.

Subsequently, the thermal expansion body 6 is disposed on the lower film 4b. The mandrel 3 is sandwiched between the thermal expansion body 6 and the to-be-joined portion W2b of the second composite material W2.

Subsequently, the upper mold 1 and the lower mold 2 are pressed together so that the cavity surface 1d and the cavity surface 2d face each other. In other words, the upper mold 1 and the lower mold 2 are clamped. The upper film 4a and the lower film 4b are then bonded together to form the first bag 4. At this time, in order to prevent the mold from being opened against the application of pressure to the first bag 4 and the thermal expansion of the thermal expansion body 6 later, the upper mold 1 and the lower mold 2 are clamped and held by a necessary force by a mold clamping device such as a press (not shown) or a bolt.

Subsequently, the first bag 4 and the thermal expansion body 6 are expanded, and the mandrel 3 is pressed against the to-be-joined portion W2b of the second composite material W2 (step ST32).

Specifically, gas is supplied to the inside of the first bag 4 and pressurized. Further, the thermal expansion body 6 is heated to be thermally expanded. The pressurization of the inside of the first bag 4 and the heating of the thermal expansion body 6 may be performed substantially simultaneously. In addition, when the thermal expansion body 6 is thermally expanded, the pressure P3 in the thermal expansion body 6 may be larger than the pressure P1 in the first bag 4. As a result, the first bag 4 and the thermal expansion body 6 expand, and the mandrel 3 is pressed toward W1b, W2b of the to-be-joined portion (here, the X-axis negative direction). Thus, the mandrel 3 is pressed against the to-be-joined portion W1b, W2b. The first and second composite materials W1, W2 are heated and cured using a temperature controller. More specifically, since the to-be-joined portion W2b is heated while being pressed from the mandrel 3, the resin included in the to-be-joined portion W2b is cured. Consequently, the first composite molded body M1 and the second composite molded body M2 shown in FIG. 7 are formed.

As described above, the first composite material W1 and the second composite material W2 can be formed to produce the first and second composite molded bodies M1, M2, respectively.

According to the manufacturing process of the composite molded body according to the present embodiment, the thermal expansion body 6 presses the mandrel 3 against the to-be-joined portion W2b of the second composite material W2, to produce a second composite molded body M2. The joint portion M2b of the second composite molded body M2 has a high profile accuracy. Therefore, it is possible to improve the geometric accuracy of the joint portions M1b, M2b of the first and second composite molded bodies M1, M2. Further, by using the thermal expansion body 6 having a simple configuration, it is possible to improve the geometry accuracy of the joint portion M2b of the second composite molded body M2.

Further, according to the manufacturing method of the composite molded body according to the present embodiment, since the thermal expansion body 6 is expanded with respect to the force mandrel 3 is pushed back by the expansion of the end 4c of the first bag 4, stronger to-be-joined portion W2b is pressed against the to-be-joined portion W1b. Therefore, it is possible to improve the geometric accuracy of the joint portion M2b of the second composite molded body M2.

Incidentally, by joining the joint portions M1b, M2b of the first and second composite molded bodies M1, M2 shown in FIG. 7, it is possible to obtain a composite material joint body. The composite material joint body can be used, for example, as a wing or a propeller of a flying object. When the composite material joint body is a propeller of a flying body, the first composite molded body M1 and the second composite molded body M2 are skins, and the joint portions M1b, M2b is a leading edge portion of a wing or a propeller of the flying body. As described above, since it is possible to improve the geometric accuracy of the joint portions M1b, M2b, there is almost no gap in the joint portions M1b, M2b, and the adhesiveness thereof is higher. Therefore, the joint portions M1b, M2b are suitable as leading edge portions. The aerial vehicle is, for example, an airplane or an Electric Vertical Take-Off and Landing Aircraft (eVTOL). A constituent member such as a spar may be attached to the inside of the composite material joint body as appropriate.

The present disclosure is not limited to the above embodiments, and can be appropriately modified without departing from the spirit thereof. In addition, the present disclosure may be implemented by appropriately combining the above-described embodiments and one example thereof

What is claimed is:

1. A method for producing a composite molded body in which first and second composite materials are shaped, and first and second composite molded bodies are shaped, the first and second composite molded bodies each including a joint portion that is able to be joined to each other, the joint portion of each of the first and second composite molded bodies being joined to each other to shape a composite material joint body, the first and second composite materials each including a to-be-joined portion corresponding to the joint portion of each of the first and second composite molded bodies, the method comprising:
   a step of arranging both a mandrel and a pressing portion in a space, the space being sandwiched between the first and the second composite materials that are arranged in a mold, the arranged mandrel being sandwiched between the pressing portion and the to-be-joined portions of the first and the second composite materials; and
   a step in which the pressing portion presses the mandrel against the to-be-joined portion of the second composite material.

2. The method according to claim 1, wherein:
   in the step in which the pressing portion presses the mandrel against the to-be-joined portion of the second composite material, the pressing portion includes a first bag that is able to be expanded; and
   the pressing portion presses the mandrel against the to-be-joined portion of the second composite material by supplying gas into the first bag to pressurize an inner side of the first bag or expand the first bag.

3. The method according to claim 2, wherein:
   the first bag includes an end portion inserted between the to-be-joined portions of the first and the second composite materials; and
   in the pressing portion, the end portion of the first bag presses the to-be-joined portion of the first composite material against the mold by supplying the gas into the first bag to pressurize the inner side of the first bag or expand the first bag.

4. The method according to claim 2, wherein:
   in the step in which the pressing portion presses the mandrel against the to-be-joined portion of the second composite material, the pressing portion further includes a second bag arranged in the first bag; and
   the pressing portion supplies the gas into the second bag to expand the second bag.

5. The method according to claim 4, wherein pressure P2 in the second bag is greater than pressure P1 in the first bag.

6. The method according to claim 2, wherein:
   in the step in which the pressing portion presses the mandrel against the to-be-joined portion of the second composite material, the pressing portion includes a thermal expansion body arranged in the first bag; and the pressing portion heats and thermally expands the thermal expansion body.

7. The method according to claim 1, wherein:
the composite material joint body is a propeller of a flying object; and
in the composite material joint body, the joint portion of each of the first and the second composite molded bodies joined to each other is a leading edge portion of the propeller of the flying object.

\* \* \* \* \*